Patented Sept. 2, 1924.

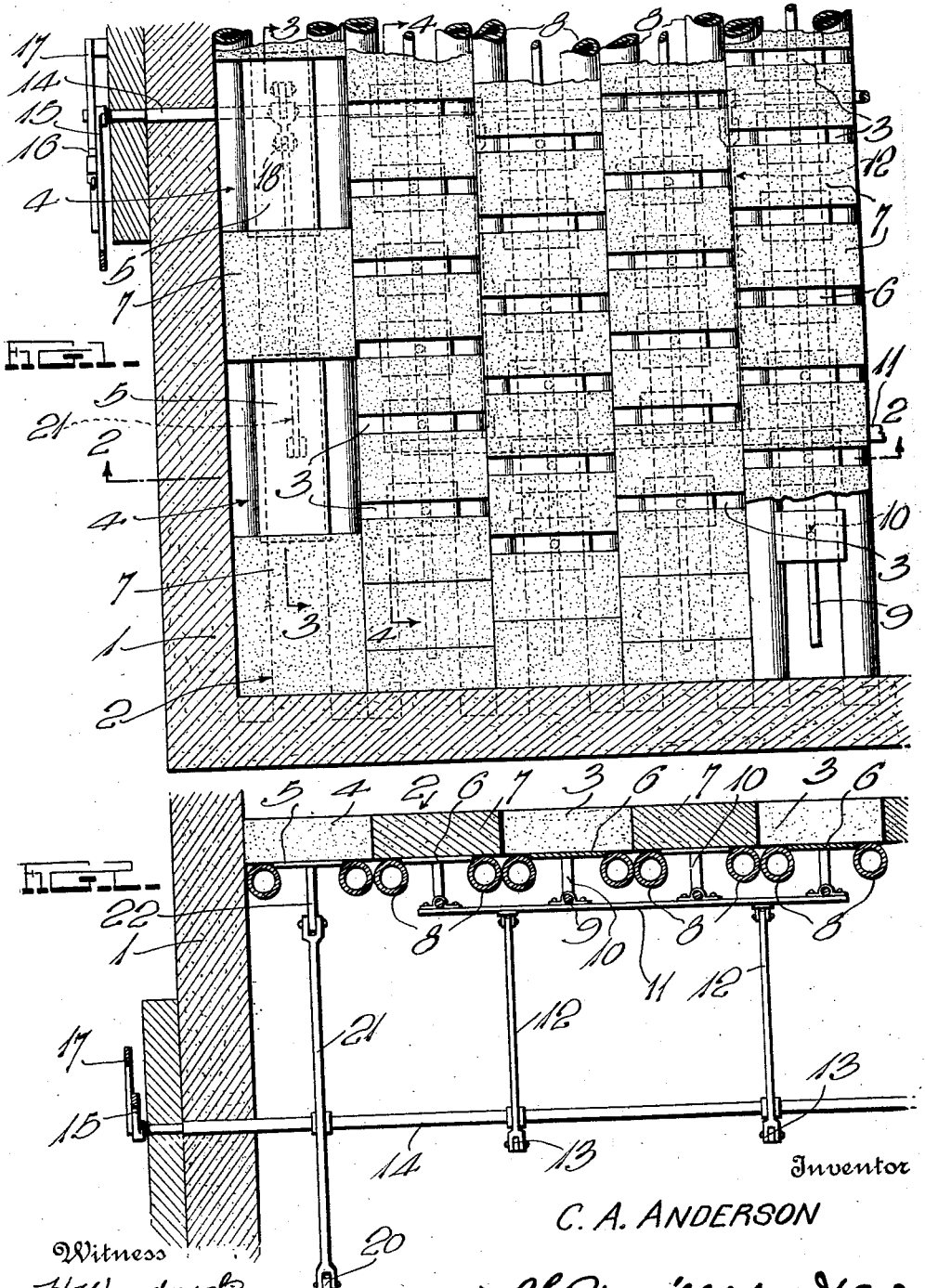

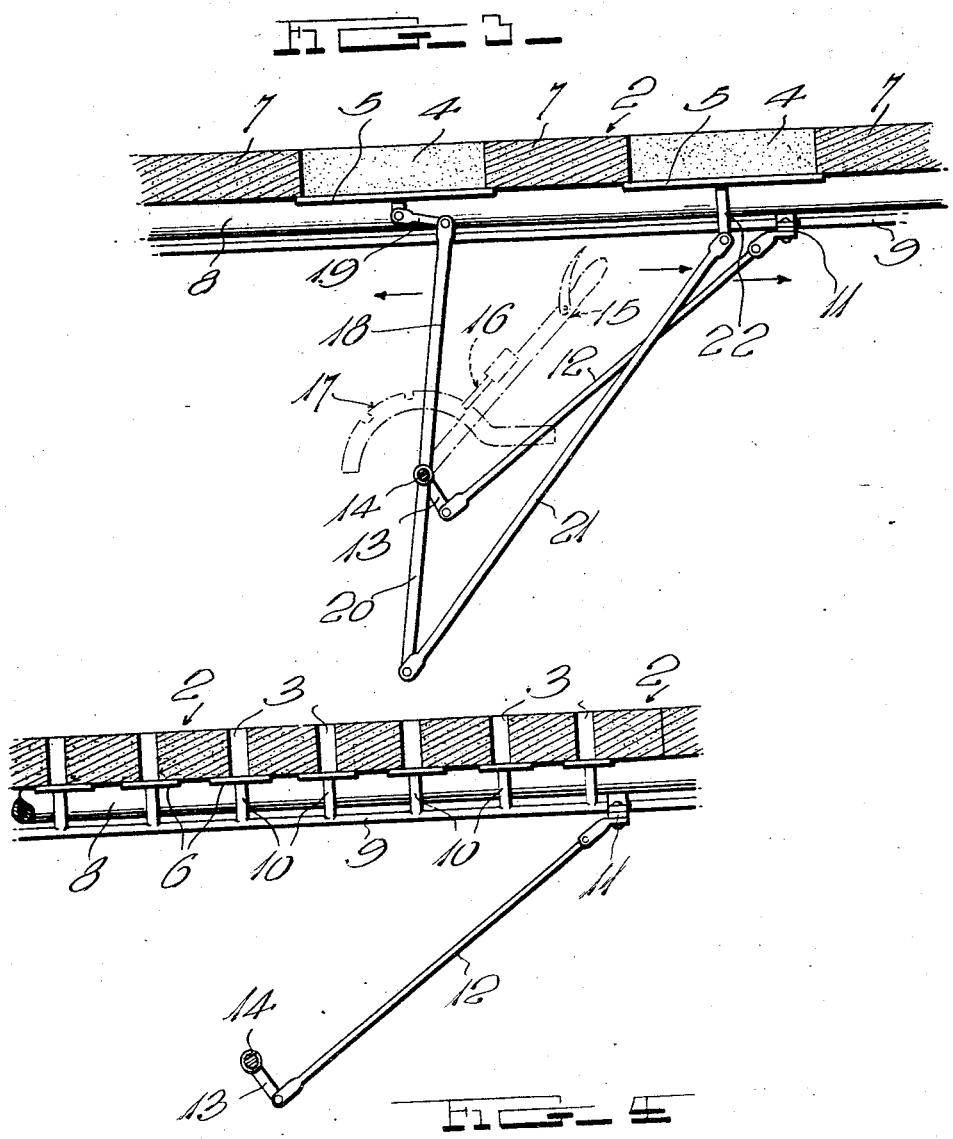

1,507,450

UNITED STATES PATENT OFFICE.

CHARLES A. ANDERSON, OF NEW ORLEANS, LOUISIANA.

AIR CONTROL FOR LIQUID-FUEL-BURNING FURNACES.

Application filed February 8, 1923. Serial No. 617,895.

*To all whom it may concern:*

Be it known that I, CHARLES A. ANDERSON, a citizen of the United States, residing at New Orleans, in the parish or Orleans and State of Louisiana, have invented certain new and useful Improvements in Air Controls for Liquid-Fuel-Burning Furnaces; and I do declare the following to be a full, clear, and exact description of the invention, such as will enable others skilled in the art to which it appertains to make and use the same.

My invention relates to improvements in furnaces provided with burners for consuming liquid fuel and has for its principal object to provide a new and improved arrangement of air inlet openings and controlling dampers therefor, associated with the bottom or floor of the furnace for conveying the proper amount of air to the combustion chamber, according to the load under which the furnace is operated and the amount of liquid fuel being consumed, the arrangement being such as to distribute the incoming air over the combustion chamber in the most desirable manner to effectively support combustion.

In carrying out the above end, a further aim is to provide for supplying a somewhat greater amount of air at the front of the combustion chamber, at which the burner is located, with the advantages well known to the art.

A still further object is to provide novel means for mounting and operating the slidable damper plates which are employed for controlling the air inlet openings in the floor of the furnace.

With the foregoing in view, the invention resides in the novel subject matter hereinafter described and claimed, the description being supplemented by the accompanying drawings;—

Figure 1 is a horizontal sectional view through a portion of a furnace showing the application of my invention thereto.

Fig. 2 is a vertical longitudinal sectional view as indicated by line 2—2 of Fig. 1.

Figs. 3 and 4 are vertical transverse sectional views as indicated by the lines 3—3 and 4—4 of Fig. 1.

In the drawings more briefly described, the numeral 1 designates the wall of a furnace provided with a liquid fuel burner (not shown). This furnace is provided with a preferably horizontal floor 2 and the greater part of the area of this floor is provided with transverse parallel rows of air inlet openings 3, the front portion of said floor however, which is under the burner, being formed with a plurality (preferably two) of comparatively large openings 4 through which an abundance of air may enter beneath the burner. For controlling this entrance of air through the openings 4, a pair of relatively large sliding damper plates 5 are employed under the floor 2 and comparatively small plates 6 are used to regulate the entrance of air through the opening 3, these plates being mounted and operated in a novel manner, described below.

In the preferred form of construction, the floor 2 is formed of transverse rows of fire bricks 7 spaced apart sufficiently to form the air inlet openings 3 and 4 and for supporting these bricks, I provide several transverse pairs 8 of parallel horizontal bars, these bars being preferably formed of piping, as shown. The inner opposed sides of the bars 8 of each pair are in acute angular relation with the bottom of the floor 2, by virtue of the transverse formation of said bars. I make use of these acute angles to slidably receive opposite edges of the damper plates 5 and 6 as disclosed in Fig. 2, said plates resting upon the bars 8. Thus, these bars serve to slidably support the numerous damper plates, as well as acting to support the floor 2.

In the form of construction herein disclosed, parallel transverse rods 9 are disposed one beneath each row of the damper plates 6 and these plates and rods are connected by separate struts or the like 10. All of the rods are preferably connected with each other by a longitudinal bar 11 connected by inclined links 12 with a pair of depending crank arms 13 on a longitudinal rock shaft 14 which extends through the front of the furnace and is provided with an appropriate operating lever 15. This lever may be held in any one of a number of adjusted positions, by means of an appropriate pawl 16 and segment 17.

On the rock shaft 14, adjacent the front wall of the furnace, I provide an upwardly extending crank arm 18 connected by a link or the like 19 with one of the relatively large damper plates 5, while a depending crank arm 20 is provided also on said shaft and is connected by a relatively long link 21 with a depending arm 22 on the other of said plates 5. By this, or a similar arrangement, the plates 5 and 6 will be simultaneously opened or closed, according to the direction in which the lever 16 is moved, but the movement of said plates 5 will be greater than the plates 6, to adequately control the relatively large openings 4 with which they co-operate.

By employing the construction herein shown and described, or a substantial equivalent thereof, it will be seen that the air supplied to the furnace, may be accurately regulated according to the amount of liquid fuel being consumed and the load under which the furnace is operated. The distribution of air into the combustion chamber is such as to obtain the best possible results and hence a great number of disadvantages heretofore encountered in the burning of oil in furnaces, are effectively overcome.

As excellent results may be obtained from the details disclosed, these details may well be followed. However, within the scope of the invention as claimed, numerous minor changes may be made.

I claim:—

1. A liquid fuel burning furnace having a plurality of relatively small air inlet openings spaced apart over the greater part of the area of its floor, the front end of said floor having relatively large air inlet openings; damper plates for controlling said openings, and means for simultaneously operating all of said damper plates and for moving the plates of said relatively large openings a greater amount than the other plates.

2. A liquid fuel burning furnace whose floor is formed with a plurality of parallel rows of relatively small air inlet openings, said floor also having a pair of relatively large openings, rows of damper plates for controlling said rows of relatively small openings, means for sliding said rows of dampers, including a rock shaft at right angles to said rows of openings and plates, a pair of damper plates for said relatively large openings, an upstanding crank arm on said rock shaft connected to one of said pair of plates, and a depending crank arm on said shaft linked to the other of said pair of plates.

3. A liquid fuel burning furnace whose bottom is formed with parallel rows of air inlet openings, rows of damper plates for controlling said openings, parallel rods extending under and connecting the plates of the rows, a bar at right angles to said rods connecting them for movement in unison, and operating means connected with said bar.

4. A liquid fuel burning furnace having a floor formed with an air inlet opening, parallel supporting bars for the floor whose inner opposed sides are in acute angular relation with said floor, and a slidable damper plate for said opening disposed under said bottom with its opposite edges received in the angles between said bottom and said inner opposed sides of said parallel supporting bars.

5. A liquid fuel burning furnace comprising a combustion chamber, a plurality of pairs of spaced parallel bars extending across said chamber, a fire brick floor formed of rows of spaced bricks whose ends rest on said bars, the inner opposed sides of the bars of each pair being disposed in acute angular relation with the lower sides of the bricks, and dampers for controlling the passage of air through the spaces between the bricks, said damper plates having their edges slidably received in the acute angles between said inner opposed bar sides and said bricks.

6. A liquid fuel burning furnace formed with a pair of air inlet openings, a pair of slidable damper plates for controlling said openings, a rock shaft at right angles to the line of movement of said damper plates, oppositely extending crank arms on said shaft, means connecting one of said arms with one of said plates, and a link connecting the other arm to the other plate.

In testimony whereof I have hereunto affixed my signature.

CHARLES A. ANDERSON.